United States Patent [19]
Van Patten

[11] 3,724,102
[45] Apr. 3, 1973

[54] LANGUAGE TEACHING DEVICE
[76] Inventor: Charles A. Van Patten, 1220 Park Avenue, New York, N.Y. 10017
[22] Filed: May 24, 1972
[21] Appl. No.: 256,529

Related U.S. Application Data
[63] Continuation-in-part of Ser. No. 206,103, Dec. 8, 1972, abandoned.

[52] U.S. Cl. ............................................. 35/35 H
[51] Int. Cl. ........................................ G09b 19/08
[58] Field of Search .......... 35/35 R, 35 H, 35 J, 35 E; 283/46

[56] References Cited
UNITED STATES PATENTS

| | | | |
|---|---|---|---|
| 680,311 | 8/1901 | Browne | 283/46 |
| 2,222,245 | 11/1940 | Steen | 35/35 J UX |
| 2,287,943 | 6/1942 | O'Sullivan | 35/35 H |
| 2,385,452 | 9/1945 | Lande | 35/35 H |
| 2,503,130 | 4/1950 | Poritz | 35/35 E X |
| 3,271,849 | 9/1966 | Roberson | 35/35 E |
| 3,435,542 | 4/1969 | Barouh | 35/35 E |

Primary Examiner—Wm. H. Grieb
Attorney—Howard K. Kothe et al.

[57] ABSTRACT

A language teaching device which includes an open-ended holder in which can be received a card having intelligence in a first foreign language provided on the opposite faces of the card. The intelligence is arranged on the card in a column of successive linear entries extending longitudinally of the card and corresponding intelligence in the language of the user is provided in like manner on portions of the sides of the holder, the holder being of a transparent material which is masked in respect of the portions thereof carrying intelligence so that the card may be viewed through the unmasked portions. The card and holder further are provided with cooperating indicia means for assuring that the corresponding side of the card appears through the unmasked portion of the holder and for aligning the intelligence on the card and that on the holder registrably thereby associating any given entry in the language of the card with its corresponding equivalent in the language of the holder.

20 Claims, 13 Drawing Figures

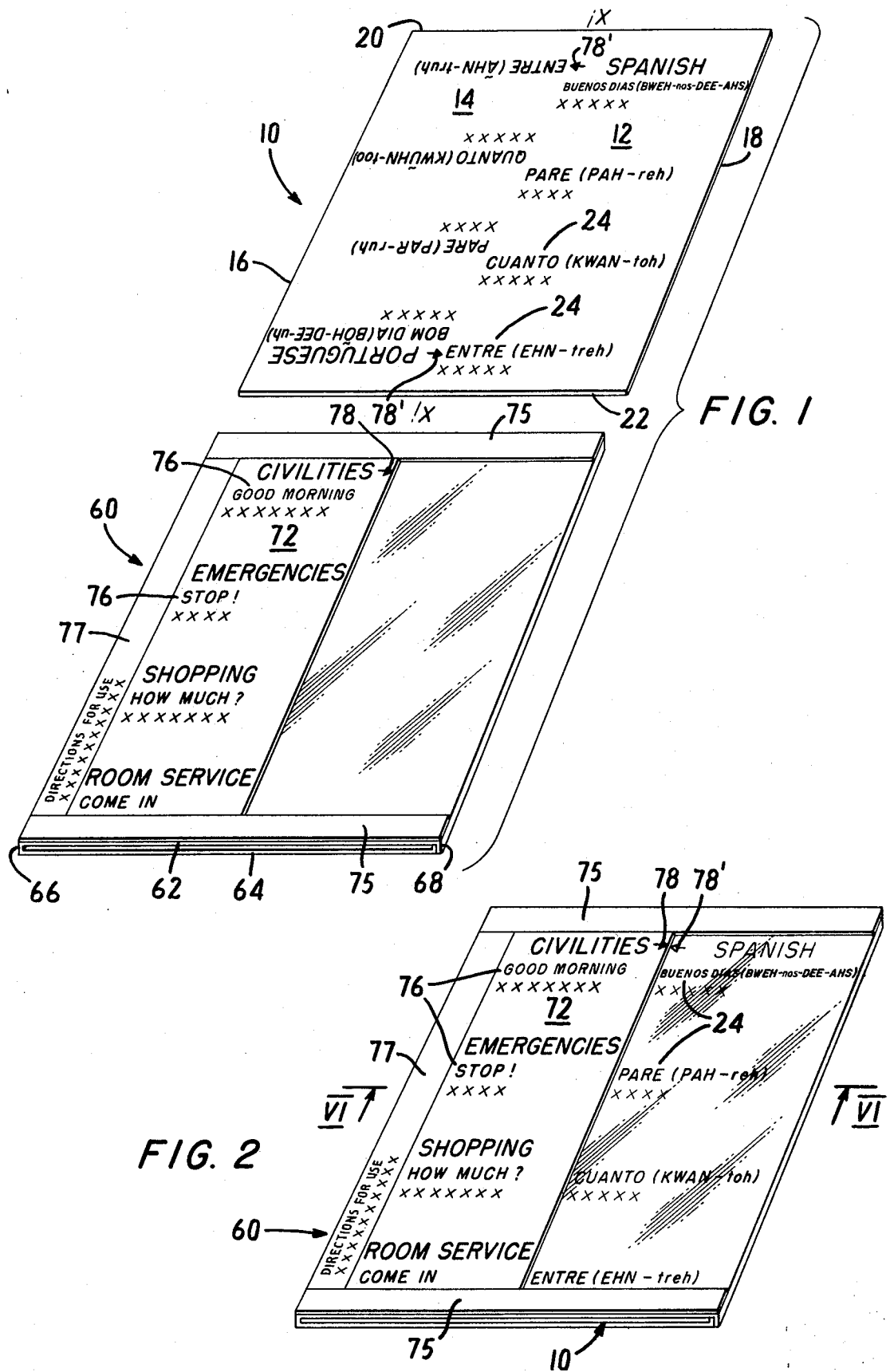

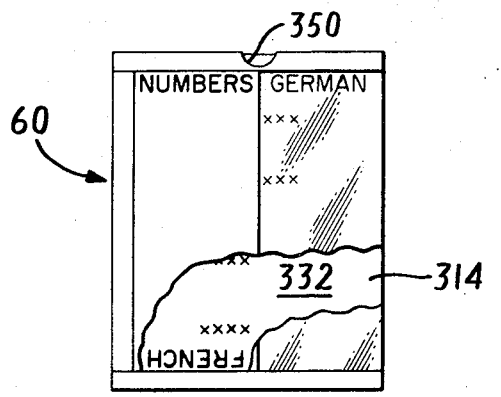
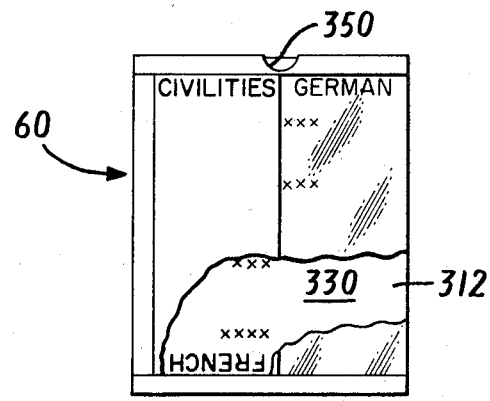
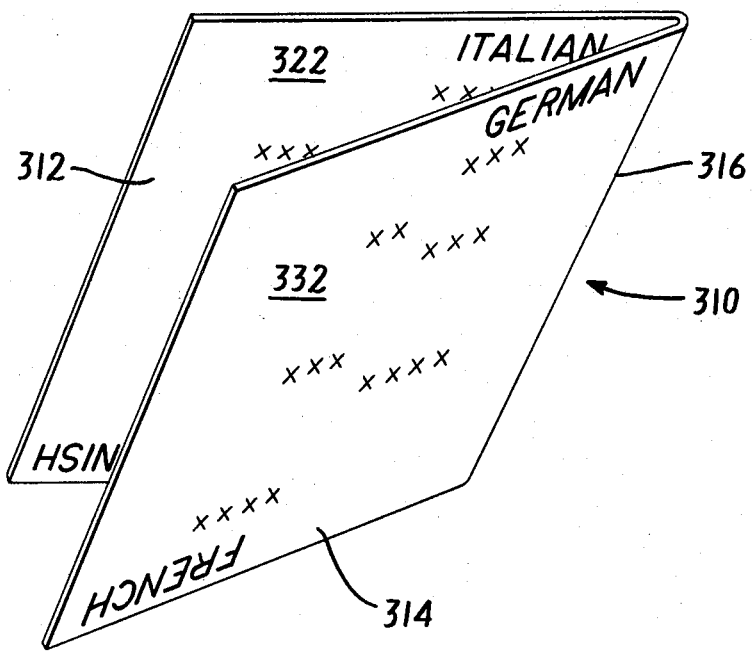

LANGUAGE TEACHING DEVICE

CROSS-REFERENCE TO RELATED APPLICATION

This application is a continuation-in-part of my co-pending application Ser. No. 206,103 filed Dec. 8, 1972, and now abandoned.

BACKGROUND OF THE INVENTION

Teaching devices used for language instructional purposes are known. For example, U.S. Pat. Nos. 3,271,884 and 3,435,542 each describe representative forms of devices known for such purposes. However, these devices as well as other known forms of devices are of moderately complex construction thereby being somewhat expensive to make and sometimes cumbersome to use, particularly in respect of the suitability of the device for carrying on the person of the student or user or for optimally accessible storage in an automobile, so that when the student or user is traveling or motoring he may conveniently carry and readily use the teaching device for conversational and directional purposes. Accordingly, it is desirable that a more simplified and conveniently employed form of language teaching device which can be carried in a clothing pocket or purse of the user be provided, and that such device be particularly suited for convenient use by a traveler.

SUMMARY OF THE INVENTION

The present invention is concerned with a teaching device and more particularly relates to a teaching device for language instructional purposes and foreign travel.

It is an object of the present invention to provide a language teaching device which is relatively simple in construction, simple to use, compact for carrying purposes and which embodies features permitting use of the same in conjunction with instruction and use in plural foreign languages, as well as providing means to assist the user in properly pronouncing foreign language words.

In accordance with the present invention, the language teaching device includes an open-ended elongated holder having a pair of flat spaced sides of transparent material and in which can be received an elongated card, the card being slidably insertable into the holder through an open end thereof. The holder is provided with means for masking an areal portion of each side and on the masked portion is provided intelligence in a particular language, preferably the language of the user and for example, English. Preferably, the intelligence is arranged on the sides of the holder in columnar form, the successive linear intelligence entries being disposed longitudinally of the holder. Preferably, the masking means at each side of the holder and accordingly, the intelligence thereon, is arranged at one side of the medial longitudinal axis of the holder. The card which is received in the holder and which has an expanse substantially coextensive with that of the sides of the holder is provided with intelligence in one or more languages foreign to that on the holder. The card can be provided on each face surface thereof with a pair of segregated longitudinally disposed areas with intelligence being provided in one or both of the areas on each face surface such intelligence being arranged in a column of successive linear entries in correspondence to the arrangement of the intelligence carried on the holder. The intelligence on each face surface of the card is disposed such that the card intelligence can be registrably aligned with the intelligence on the holder. Suitable cooperating indicia means are provided on both the holder and the card for effecting location of the corresponding side of the card within the holder in a selected positioning wherein the respective intelligence on both registrably aligns.

In one form of the device, the intelligence on the two sides of the holder is arranged in categories of subject matter, such as intelligence specific to civilities or amenities, directions or travel information, shopping and like matters, with each category including a number of specific entries relating to the category. The intelligence entries on the card can in one form be provided in ordinary and phonetic spelling of a first foreign language in correspondence to the entries on the holder in the language of the user. In such form of the device, the masking means and accordingly, the intelligence on the one side of the holder can be arranged to be upright readable relative to one end of the holder at one side of the medial longitudinal axis of the holder with the masking means and intelligence at the other side of the holder being disposed at the other side of such medial axis but being arranged to be upright readable from the same end of the holder. In similar fashion, the intelligence on the card is arranged to be upright readable from a common end of the card with the intelligence on one face surface arranged at one side of the medial longitudinal axis of the card whereas that on the other face surface of the card is arranged at the other side of such card medial longitudinal axis. In this manner when the card is inserted in the holder, the device provides maximum instructional capability without altering the positioning of the card in the holder and for this purpose the holder being turned over and/or rotated as needed in respect of the subject matter at the two sides thereof, with the cooperating indicia means which is provided on the masking means and card for effecting location of the corresponding side of the card within the holder in a selected positioning to bring the corresponding intelligence on each into registrable alignment being provided in a discrete form associated with the particular sides of the holder and card, assuring proper insertion of the card within the holder to effect association of the various categories of intelligence with the corresponding card intelligence. Such indicia means can, for example, comprise a readily discernible marking, e.g., color coding or an arrow arrangement having a different location than that of the first-mentioned color code or arrow arrangement and as such being discernible as associated with said other side and face surface.

Other forms of the device provide that the same may be used for instructional purposes in teaching more than one foreign language with the same card, or in providing a separate large printing form of pronunciation intelligence in phonetic form for said one foreign language instead of combining it with the ordinary spelling intelligence entries, the latter form being of particular advantage in that proper pronunciation of certain foreign language words is critical to convey a correct meaning, as for example, the closeness in sound of the French expressions "Je vai me coucher" (meaning — "I am going to bed") and "Je vai m'accoucher" (meaning — "I am putting myself into confinement for childbirth") where the oral difference lies merely by the difference in one syllable between a mute *e* and *a*. In such forms of the device, the card, if it is to be used for plural language instruction purposes, is provided at each face surface thereof with columnar intelligence entries in the areas thereof at the other side of the medial longitudinal axis of the card. Such other intelligence in, for example, a second language foreign to the language of the user is arranged at both face surfaces of the card to be upright readable from the other end of the card. In this manner, the card when removed from the holder and rotated in a plane 180° in respect of the disposition of the card in the holder when employed for instructional purposes in connection with the first foreign language and then inserted back in the holder with the cooperating indicia means being employed to effect proper positioning of the card therein provides second foreign language instructional capability. Instead of using the last described intelligence arrangement on the card for teaching a second foreign language, the intelligence can be provided in large type phonetic spelling of the first foreign language intelligence so that the card when oriented 180° and inserted in the holder will align such phonetic intelligence in the first foreign language with the intelligence carried on the holder to facilitate proper pronunciation by the user of the particular first foreign language associated with the card.

The card used in the language teaching device in one form is an essentially flat sheet-like component and has parallel opposite face surfaces along with spaced and preferably parallel and longitudinal transverse margins. As has already been indicated, such single component card can be used in association with two languages foreign to the language of the holder with other variations including the provision of certain special phonetic capabilities on the card. In accordance with a further embodiment of the invention, an additional form of card may be used in which the card is comprised of a sheet having first and second portions which are foldable in predetermined direction against each other along a centrally disposed sheet fold line to a condition in which one portion of the card is coextensively superposed with the other and thereby forming a card component which has two juxtaposed inner face surfaces and two outer face surfaces. One face of the unfolded sheet thus provides the two inner face surfaces of the folded component whereas the other face provides two outer face surfaces. The respective inner and outer face surfaces can be arranged with intelligence in the same manner as described earlier in respect of the disposition of the same as well as the reading of the intelligence in one segregated face area from one transverse margin whereas that in the other segregated area of the face portion is readable from the opposite transverse margin.

The advantage of a card component fashioned in this manner is that it provides the capability of including four foreign languages on the component, two of such languages being associated with one face of the sheet and the other two with the other face of the sheet. To receive this card component in the card holder, the card is folded along the central fold line and when the card is then received in the card holder the intelligence thereon aligns with the intelligence on the masked portion of the card holder, so that one of the four foreign languages is available for translational purposes in regard to the meanings of the intelligence on the holder. By removing the card and card component and subjecting the same to a planar rotation of 180° as described earlier, a second foreign language on the outer face surfaces of the folded card component can be used with the card holder. To utilize the card component thereafter in connection with the third and fourth foreign languages, the card component can be folded in reverse manner, that is in a direction opposite to the predetermined direction in which it was first folded and then when reinserted in the card holder provides in the manner described above for the additional translational capabilities in such two additional foreign languages.

The invention accordingly comprises the language teaching device and translator device possessing the features, properties and relation of elements which will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings, wherein like reference numerals identify like parts throughout and in which:

FIG. 1 is a perspective view of the holder and card comprising the device of the present invention, the card being shown in a position preliminary to the insertion of the same within the holder, there being depicted the intelligence arrangement associated with one side of the holder and its associated face surface of the card.

FIG. 2 is a perspective view depicting the device following the insertion of the card within the holder.

FIGS. 11 and 12 show respectively the opposite faces of the card component depicted in FIGS. 8 and 9 when the same have been folded in a direction opposite to the predetermined direction and received in the card holder to provide translational capabilities in two more foreign languages of the total of four foreign languages with which the said card component is associated.

FIG. 13 is a perspective view of the card depicted in FIG. 10 when it has been partly folded in said direction opposite to the predetermined direction in which the card described in FIG. 10 was folded.

DESCRIPTION OF THE PREFERRED EMBODIMENTS

Figure 3:
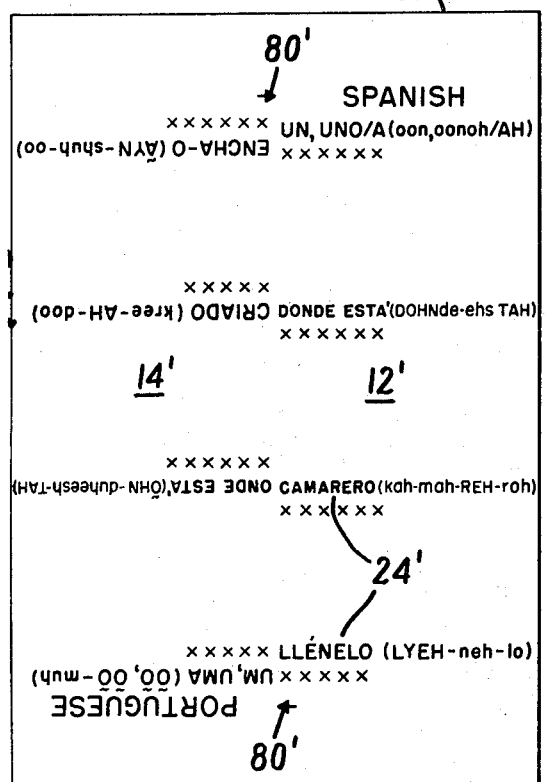
FIG. 3 is a plan view of the other face surface of the card employed in the device depicted in FIGS. 1 and 2 and further illustrating the different categories of intelligence carried on such other face surface of the card.

Referring to FIG. 1, the language teaching device of the present invention comprises two cooperating components, namely, a card 10 and open-ended holder into which the card can be inserted in a selected positioning wherein intelligence on the card will registrably align with intelligence on the holder in a manner to be described presently. The card 10 is an elongated member of relatively thin, essentially flat sheet-like character and having opposite, preferably parallel face surfaces, each of which is provided with a pair of segregated longitudinally disposed areas 12, 14 and 12', 14', respectively (FIGS. 1 and 3). The card 10 can be formed from any material suited to the intended purpose, including stiffened paper, cardboard, plastic, metal, etc. and is provided with preferably parallel longitudinal side margins 16, 18 and transverse end margins 20, 22. Each face surface of the card 10 is provided in one of its two areas with intelligence 24, 24' in a particular language foreign to that of the user, for example, Spanish, the intelligence being provided in any suitable manner such as printing, etc. and being arranged in a column of successive linear entries extending longitudinally of the respective areas. In the depicted form of the device, the intelligence on the face surface area 12 is arranged at one side of the longitudinal medial axis X—X of the card whereas the intelligence in the area 12' at the outer face surface of the card is located at the other side of such medial longitudinal axis.

The holder 60 is comprised of a pair of generally flat spaced sides 62, 64 preferably of transparent colorless material between which the card 10 can be received when the latter is slidably inserted into the holder through an open end thereof with the expanse of the card being substantially coextensive with that of the sides 62, 64 of the holder when the card is received therein. The holder 60 can be made from any suitable material, transparent clear plastic material being preferred, the holder conveniently being made, e.g., from a single sheet of such material and being folded to provide the sides 62, 64 with the latter being maintained spaced by the integral side wall parts 66, 68 of the holder structure. Suitable plastics include acrylics, Mylar, etc. Masking means 72, 72' are provided on the respective sides 62, 64 (preferably the outer surfaces thereof) of the holder and mask an areal portion of such sides in at least an expanse substantially coextensive with the other areas 14, 14' of each face surface of card 10 when the latter is received in the holder with the masking means 72, 72' being provided with intelligence 76, 76' in the language of the user, e.g., English, and arranged in a column of successive linear entries in correspondence to the disposition of the intelligence carried on the card. As used herein, "language of the user" is intended to be interchangeable in meaning with "language of the holder."

Figure 4:
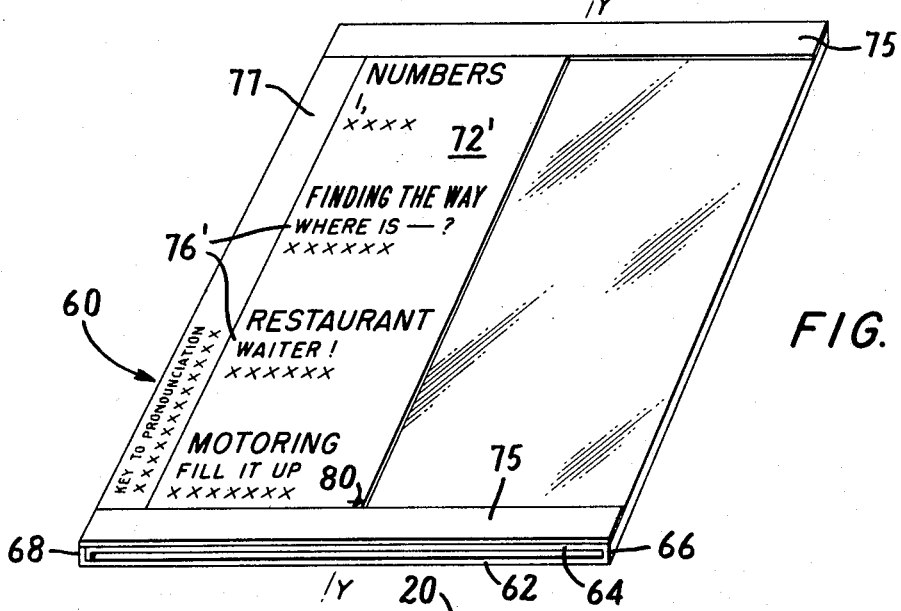
FIG. 4 is a perspective view of the other side of the holder depicted in FIGS. 1 and 2, the holder having been rotated about its longitudinal axis 180° in respect of the position thereof depicted in FIG. 1.

As will be noted in FIG. 1, the masking means 72 is arranged to cover all of holder side 62 to at least one side of the longitudinal medial axis Y—Y of the holder, while the masking means 72' is arranged to cover all of holder side 64 to the other side of such axis Y—Y (FIG. 4), such masking means further optionally including strip-like extensions 75 extending across the respective holder sides 62, 64 at the transverse extremities of the latter to define a frame for the window through which the intelligence on the card is viewed. Additionally, a segment of each masking means as at 77 can be employed for receiving intelligence respecting use of the device, key to phrase pronunciation and the like in the manner depicted.

The intelligence 76, 76' carried on the masking means 72, 72' of the holder 60 can be arranged in categories of common subject matter. Thus, one side of the holder contains intelligence entries relating to civilities, emergencies, shopping and room service categories, etc. whereas, the other side 64 of the holder can contain categories pertaining to numbers, directional instructions, room service and motoring needs. The masking means 72, 72' can be provided on the holder in a number of ways. For example, such masking means can be a layer comprising a coating of opaque material embodied in the transparent plastic or it could be a printed coating on the surface of each side or it could comprise a sheet of opaque material secured to each of the respective sides.

When using the language teaching device of the present invention, it is necessary to bring the corresponding face surface of card 10 when inserted in the holder 60, into exact selected location therein so that the intelligence 24, 24' on the card 10 registrably aligns with the corresponding intelligence 76, 76' on the holder. For this purpose, cooperating indicia means are provided on the card and the holder so that when such indicia means are brought into cooperation, the card 10 is properly aligned and oriented in the holder 60. Such indicia means can comprise various forms of markings on the masking means at each side of the holder and companion or like marking on the face surfaces of the card. In the depicted embodiment of FIGS. 1-5, the cooperating indicia means associated with one side of the holder and its associated side of the card can comprise a pair of arrowheads 78, 78' located adjacent the upper margin of each component, whereas, the indicia means on the other side of the holder and other face surface of the card can comprise an arrowhead arrangement 80, 80' located adjacent the lower margins of each. In this manner, provision is made for insertion of the proper face surface of the card in the holder in respect of the holder side associated therewith.

Figure 5:
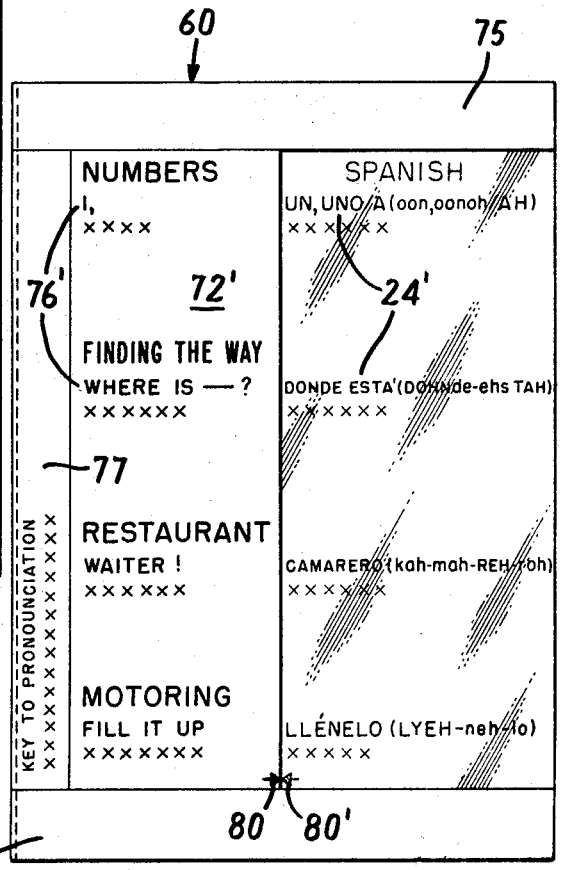
FIG. 5 is a plan view of the said other side of the holder as depicted in FIG. 4 following insertion of the card therein and showing the alignment of the intelligence on the card as depicted in FIG. 3 with the intelligence carried at the said other side of the holder.
Figure 6:
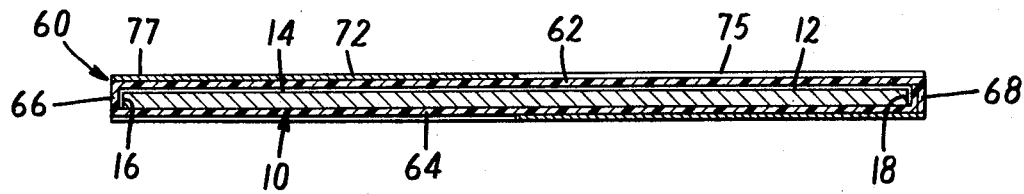
FIG. 6 is a transverse sectional view of the device taken along the line VI—VI in FIG. 2.

In use and with the card 10 inserted in the holder 60 as shown in FIG. 2, and with the cooperating indicia means 78 on the side 62 of the holder aligned with the indicia 78' on the face surface area 12 of the card, the respective intelligence on both is in registrable alignment and accordingly, the user can translate from the language of the holder to the particular foreign language associated with the card. For example, the entry "good morning" in the civilities category has its corresponding Spanish counterpart "Buenos Dias" aligned therewith. Similarly, and as can be seen in FIG. 5, the intelligence at the other face surface of the card and the other side 64 of the holder when in alignment provided further translation capability as exemplified by the English entry "Where is?" having its Spanish counterpart "Donde Esta?" in alignment therewith, the Spanish entries including the ordinary spelling of the respective words followed by the phonetic spellings of each for purposes of proper pronunciation.

As has been indicated above, the intelligence 24, 24' on the card 10 is provided such that it is arranged at one side of the longitudinal medial axis X—X of the card on one face surface and at the other side of such axis on the other face surface. The remaining area on each face surface of the card 10, that is, the areas 14, 14', respectively, also can be utilized for intelligence bearing purposes, e.g., for carrying a second foreign language, Portuguese, but in such event the intelligence orientation in such areas 14, 14' is arranged in upside down relation to that carried on the areas 12, 12'. Thus, it will be noted that the intelligence 24, 24' carried on the areas 12, 12', respectively, is arranged to be readable upright in respect of one end 20 of the card 10. The Portuguese intelligence 124, 124' on the areas 14, 14', respectively, on the other hand is printed to be upright readable relative to the other end 22 of the card. In this fashion, it is necessary to remove the card 10 from the holder in the positioning thereof depicted in FIG. 2 and rotate it in a plane 180° before reinserting the card 10 into the holder 60 to provide for bringing the intelligence in the areas 14, 14' to alignable registration with the intelligence 76, 76' on the holder.

Figure 7:
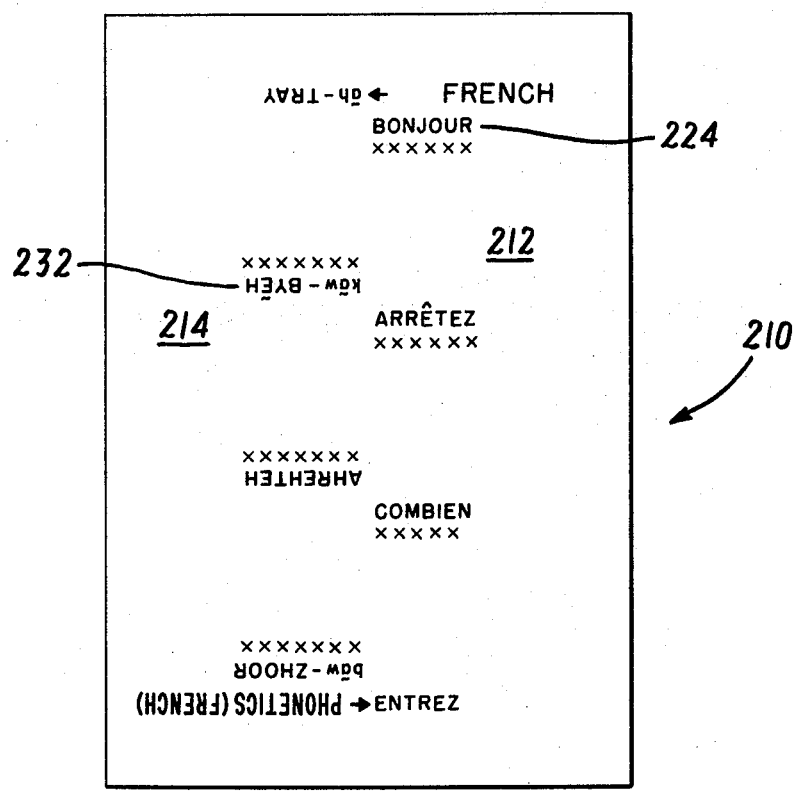
FIG. 7 is a plan view of a further form of card carrying intelligence thereon in a foreign language at one face area of the card, whereas, the other face area is provided with large type phonetic spelling of the words in the said one area to facilitate using the device in connection with pronunciation instruction in such foreign language.

While one area of each face surface (areas 12, 12' of the card 10 can be used for ordinary spelling of one foreign language word with phonetic spelling following in parenthesis, the other face area instead of being used for a second foreign language can be used for the purpose of providing the corresponding wording in the first foreign language in large form printing phonetic spelling to greatly facilitate pronunciation. Thus, the card 210 depicted in FIG. 7 is provided with one area 212 of one face surface with intelligence 224 in French in ordinary spelling only, whereas, the other face area 214 is provided with intelligence 232 in large type phonetic spelling to enhance the pronunciation arrangement of the respective intelligence entries in the two face surface areas 212, 214, being the same as above described in respect of the intelligence being upright readable from one or the other of the ends of the card.

The manner of applying the intelligence to the respective surfaces of the card and holder can be varied in accordance with the characteristics of the material used for making the card and the holder so that the indicia can be a printing on the respective components or the same can be molded integral with the components if the same are made of material suited to that end.

Figure 8:
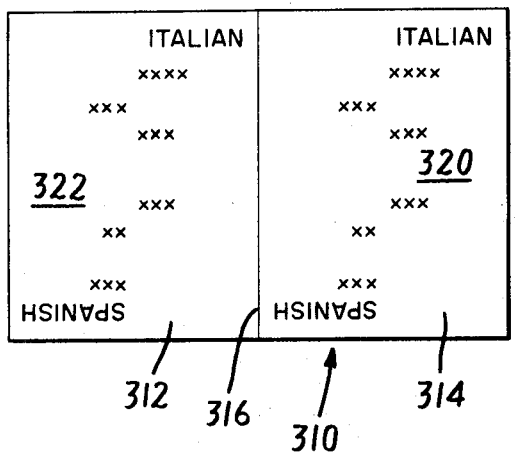
FIG. 8 is a plan view of a further form of card which is comprised of a sheet having first and second portions foldable in coextensive superposition with each other along a central fold line and depicts intelligence in two languages foreign to the language on the holder which are associated with said one face of said sheet.
Figure 9:
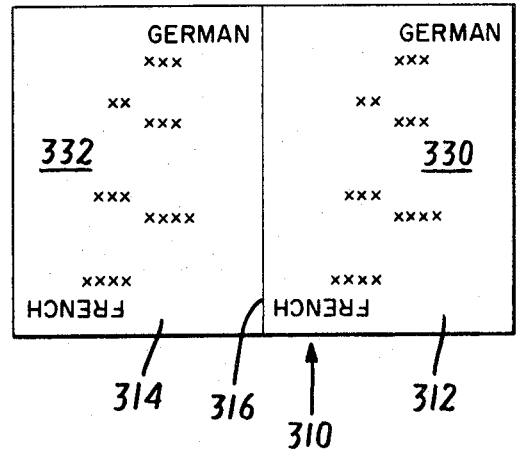
FIG. 9 is a plan view of the other face of the card shown in FIG. 8 depicting intelligence in two additional foreign languages associated with said other face.
Figure 10:
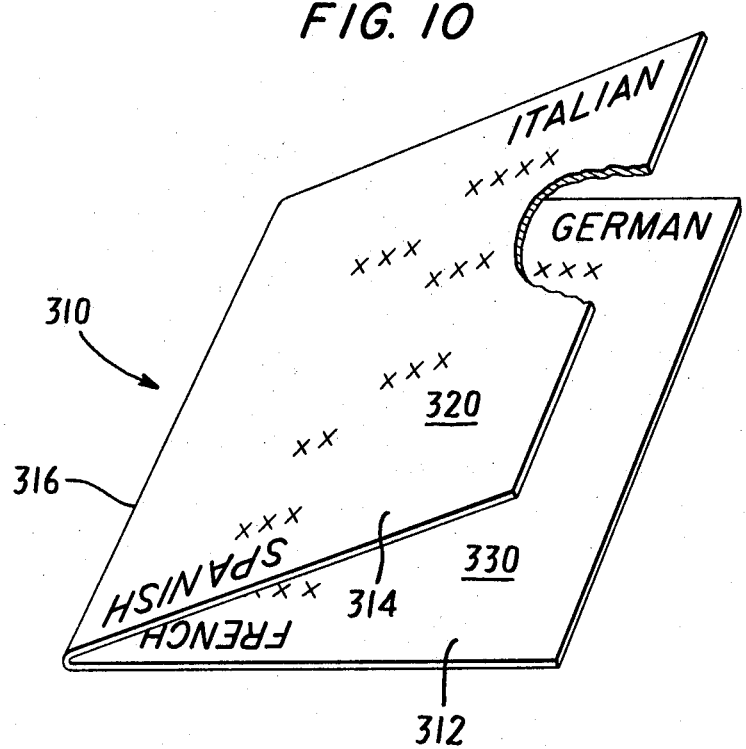
FIG. 10 is a perspective view of the card shown in FIGS. 8 and 9 in a partly folded condition incident to folding the card in a predetermined direction to provide for use of the same with two foreign languages.

A further form of the card is depicted in FIGS. 8–13. In such form of construction the card 310 is comprised of a sheet having first and second portions 312, 314 which are foldable against each other along a sheet fold line 316 which transversely bisects the sheet. Each surface of the sheet provides when the card is folded two face surfaces on which is carried intelligence. Thus, as shown in FIGS. 8 and 10, when the card is folded by movement of the card portions in a predetermined direction one face of the sheet will provide two outer face surfaces for the folded card, such outer face surfaces being depicted at 320, 322. As shown in FIGS. 9 and 10 with the card in the thus folded condition, two inner side surfaces 330, 332 will be provided.

When the card 316 is folded into the condition shown generally in FIG. 10, it provides the advantage of being usable with two foreign languages, e.g., Italian and Spanish, in conjunction with the card holder 60, the faces 320 and 322 of the card being the opposite face surfaces visible through the framed viewing sections of the card holder.

The same card component can be thereafter used with two additional languages, e.g., French and German, by removing the card component from the card holder and folding it in an opposite sense to the predetermined direction to which it was first folded to the condition shown in FIG. 13 wherein the German and French carrying face surfaces 330, 332 will be the opposite faces surfaces viewable through the card holder viewing frame sections, the observed face surfaces being shown in FIGS. 11 and 12.

When used, the card component 310 of course shows only one foreign language at a time and if, for example, the Italian intelligence is to be used in conjunction with the intelligence in the language of the user on the card holder 60, it is inserted in the condition shown generally in FIG. 10, whereas if the Spanish is to be employed, the card is removed from the card holder 60 and subjected to a planar rotation of 180° in the manner earlier described in connection with the FIGS. 1–5 construction, the card holder 60 being provided with an arcuate recess or slot 350 to facilitate the user's grasping the card 310 for effecting removal of the same from the holder.

It will thus be seen that the objects set forth above among those made apparent from the foregoing description are efficiently attained and, since certain changes in carrying out the above construction set forth, which embodies the invention may be made without departing from its scope, it is intended that all matter contained in the above description shall be interpreted as illustrative and not in a limiting sense.

What is claimed is:

1. A language teaching device comprising an elongated card having opposite face surfaces each of which is provided with a pair of segregated longitudinally disposed areas, there being provided on at least one of said areas of each face surface intelligence in a first language, the intelligence on said one area of each face surface being arranged in a column of successive linear entries extending longitudinally of the respective areas, an open-ended elongated holder having a pair of generally flat spaced sides of transparent material between which said card can be received when the latter is slidably inserted into said holder through an open end thereof, the expanse of said card being substantially coextensive with that of the sides of said holder when said card is received in said holder, means for masking an areal portion of each side of said holder in an expanse substantially coextensive with the other of the areas of each face surface of said card when the latter is received in said holder, said masking means being provided with intelligence in a second language arranged in a column of successive linear entries in correspondence to the disposition of the intelligence carried on said card, said masking means and each face surface of said card carrying cooperating indicia means for effecting proper orientation of the faces of the cards and holder and the location of said card within said holder in a selected positioning wherein the intelligence on said card registrably aligns with the corresponding intelligence on said masking means.

2. The language teaching device of claim 1 wherein the pair of segregated areas of each face surface of said card are disposed one at either side of the medial longitudinal axis of said card.

3. The language teaching device of claim 2 wherein the area on one face surface of said card having intelligence thereon is disposed at one side of said medial longitudinal axis, the area on the other face surface of said card having intelligence thereon being disposed at the other side of said medial axis, the areal portion of one of said holder sides masked by said masking means being disposed at one side of the medial longitudinal axis of said holder, the areal portion of the other of said holder sides being disposed at the other side of said holder medial longitudinal axis.

4. The language teaching device of claim 3 wherein said card has transverse margins at opposite ends thereof, the intelligence on the said one area of each of said face surfaces of said card being arranged to be upright readable relative to one of said transverse margins.

5. The language teaching device of claim 4 wherein additional intelligence is provided on the other areas of each of said face surfaces of the card, said additional intelligence being arranged in a column of successive linear entries extending longitudinally of the respective other face areas and such to be upright readable relative to the other of said transverse margins, the additional intelligence on said other face areas being registrably alignable with the intelligence on said holder when said card is received in said holder in a disposition in which it has been rotated in a plane 180° in respect of the disposition of said card in said holder when the intelligence on said one area of each face surface is registrably aligned with the intelligence on said holder.

6. The language teaching device of claim 5 wherein the intelligence provided on the said one area of each of said face surfaces of said card comprise entries in ordinary spelling of said first language, the intelligence provided in corresponding disposition on said masking means of said holder comprising entries in ordinary spelling of said second language.

7. The language teaching device of claim 6 wherein the intelligence provided on the said one area of each of said face surfaces of said card comprise additionally entries in phonetic spelling of said first language.

8. The language teaching device of claim 6 wherein the intelligence provided on the said other areas of each of said face surfaces of said card comprise entries in phonetic spelling of said first language.

9. The language teaching device of claim 6 wherein the intelligence provided on the said other areas of each of said face surfaces of said card comprise entries in a third language.

10. The language teaching device of claim 1 wherein said masking means on said holder comprises an opaque layer on each of said holder sides, the intelligence on said masking means comprising printed entries thereon.

11. The language teaching device of claim 10 wherein said opaque layer comprises a coating of opaque material embodied with said transparent material.

12. The language teaching device of claim 10 wherein said opaque layer comprises a sheet of opaque material secured to each of the sides of said holder.

13. The language teaching device of claim 1 wherein the cooperating indicia means on said masking means of said holder and each face surface of said card comprise a discrete linear marking on each.

14. The language teaching device of claim 1 wherein the cooperating indicia means on said masking means of said holder and each face surface of said card comprise a discrete color indicia on each.

15. The language teaching device of claim 13 wherein the cooperating indicia means on the masking means on one of said holder sides and that on one face surface of said card are distinct from the indicia means on the masking means on the other side of said holder and that on the other face surface of said card.

16. The language teaching device of claim 15 wherein the cooperating indicia means on the masking means on one of said holder sides and that on one face surface of said card comprise an arrowhead on each extending transversely of said respective side and face surface adjacent the upper extremities thereof, the indicia means on the masking means on the other side of said holder and that on the other face surface of said card comprising an arrowhead on each extending transversely of said other holder side and said other face surface, adjacent the lower extremities thereof.

17. The language teaching device of claim 5 wherein said card is an essentially flat sheet-like component, having parallel opposite face surfaces and spaced longitudinal margins.

18. The language teaching device of claim 5 wherein said card is comprised of a sheet having first and second portions foldable in predetermined direction against each other along a sheet fold line to a condition in which one portion is coextensively superposed with the other forming a component having two juxtaposed inner face surfaces provided by one face of said sheet and two outer face surfaces provided by the other face of said sheet, the two outer face surfaces when said sheet is folded and received in said holder constituting the intelligence bearing opposite face surfaces of said card.

19. The language teaching device of claim 18 wherein the pair of segregated areas of each of said outer face surfaces of said sheet have intelligence thereon, the intelligence of each segregated area of each outer face surface being in a language different than that of the other segregated area but the same as that of the corresponding segregated area of said other outer face surface.

20. The language teaching device of claim 19 wherein the pair of segregated areas of each of said inner face surfaces of said sheet have intelligence thereon, the intelligence of each segregated area of each inner face surface being in a language different than that of the other segregated area but the same as that of the corresponding segregated area of said other inner face surface, the languages associated with the inner face surfaces of said sheet being different from those associated with the outer face surfaces, the intelligence associated with said inner face surfaces being registrably alignable with the intelligence on said holder when said first and second portion of said sheet are folded in a direction opposite to said predetermined direction and said sheet received in said holder.

* * * * *